United States Patent
Lochocki, Jr. et al.

(10) Patent No.: US 8,265,848 B2
(45) Date of Patent: Sep. 11, 2012

(54) METHOD AND APPARATUS FOR ADAPTING MINIMUM TORQUE CONVERTER SLIP FOR NEUTRAL IDLE CONTROL

(75) Inventors: Ronald F. Lochocki, Jr., Ypsilanti, MI (US); Nicholas C. Jasko, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 890 days.

(21) Appl. No.: 12/348,959

(22) Filed: Jan. 6, 2009

(65) Prior Publication Data

US 2010/0170740 A1 Jul. 8, 2010

(51) Int. Cl.
*B60T 7/12* (2006.01)

(52) U.S. Cl. .......... 701/82; 701/51; 701/59; 701/68; 701/87; 701/90; 60/347; 91/329

(58) Field of Classification Search .......... None
See application file for complete search history.

(56) References Cited

U.S. PATENT DOCUMENTS

| | | | |
|---|---|---|---|
| 5,272,630 A * | 12/1993 | Brown et al. | 701/68 |
| 5,799,260 A * | 8/1998 | Droste et al. | 701/51 |
| 5,951,615 A * | 9/1999 | Malson | 701/57 |
| 6,928,357 B2 * | 8/2005 | Higashimata et al. | 701/87 |
| 7,189,188 B2 * | 3/2007 | Nobumoto et al. | 477/176 |
| 7,288,046 B2 | 10/2007 | Boone et al. | |
| 7,302,330 B1 * | 11/2007 | Holtz et al. | 701/51 |
| 2007/0112502 A1 * | 5/2007 | Asano et al. | 701/111 |
| 2008/0035084 A1 * | 2/2008 | Leiby et al. | 123/90.16 |
| 2008/0066567 A1 * | 3/2008 | Kobayashi et al. | 74/336 R |
| 2011/0005216 A1 * | 1/2011 | Yamashita et al. | 60/347 |

* cited by examiner

*Primary Examiner* — Khoi Tran
*Assistant Examiner* — Jonathan L Sample
(74) *Attorney, Agent, or Firm* — Quinn Law Group, PLLC

(57) ABSTRACT

A method adaptively learns torque converter (TC) slip in a transmission having a hydrodynamic torque converter assembly by setting a baseline TC slip profile, determining an actual TC slip value at different temperatures, generating an adapted TC slip profile by adapting the baseline TC slip profile in response to the actual TC slip values, and controlling the amount of TC slip during a neutral idle (NI) state of the transmission using the adapted TC slip profile. A vehicle includes a torque converter and a controller. The controller calibrates the TC slip during a first transmission state, and controls the amount of TC slip during a second transmission state. The controller measures actual TC slip data points, and adapts a TC slip profile to more closely approximate a natural slip curve of the vehicle in response to the actual slip TC slip value data points.

16 Claims, 2 Drawing Sheets

METHOD AND APPARATUS FOR ADAPTING MINIMUM TORQUE CONVERTER SLIP FOR NEUTRAL IDLE CONTROL

TECHNICAL FIELD

The present invention relates to the control of a hydrodynamic torque converter assembly in an automatic transmission, and in particular to a method and an apparatus for adaptively learning the calibration of and controlling a level of slip across the hydrodynamic torque converter assembly.

BACKGROUND OF THE INVENTION

Vehicle transmissions are designed to transmit rotational force or torque from an engine or other prime mover to the drive wheels of the vehicle in order to propel the vehicle at a relatively wide range of output speeds. The engine includes a rotatable crank shaft or output shaft that can be selectively connected and disconnected from a transmission input shaft depending upon the desired transmission operating state. When the vehicle is configured with a manual transmission, a foot-operated clutch pedal positioned within the vehicle interior can be selectively actuated in order to allow the driver to shift gears and/or place the transmission in neutral. In an automatic transmission, this connection is provided automatically via a hydrodynamic torque converter assembly.

A hydrodynamic torque converter assembly, hereinafter referred to simply as a torque converter, typically includes an impeller or a pump, a turbine, and a stationary portion or a stator. The torque converter is filled with a viscous fluid or oil. The pump, which can be bolted to a rotating flywheel portion or other rotating portion of the engine in order to continuously rotate at engine speed, discharges a supply of fluid to the turbine. A stator is installed and shaped in such a way as to redirect the fluid discharged from the turbine back into the pump. The turbine in turn is connected to the transmission input shaft. The torque converter as a whole thus enables a variable fluid coupling effect to occur automatically between the engine and the transmission, allowing the vehicle to slow to a stop without stalling, while also allowing torque multiplication to occur at lower vehicle speeds.

In some torque converter designs a lock-up torque converter clutch or TCC is used to selectively join or lock the rotating pump to the rotating turbine above a calibrated threshold lockup speed. Below the threshold lockup speed, the torque converter is uniquely configured to allow an increasing amount or level of slip to occur across the torque converter as vehicle speed decreases, ultimately reaching a maximum slip level when vehicle speed reaches zero. Regardless of whether a TCC is used, this variable slip capability allows the engine to continue to rotate when the vehicle is idling in certain transmission settings or states, e.g., in park (P), neutral (N), or when in a drive (D) state while the vehicle is at a standstill, a condition or state collectively referred to hereinafter as "neutral idle (NI)". However, although such variable slip capability is invaluable to the effective operation of a conventional automatic transmission, slip inherently results in some portion of total available power to be lost between the engine and the transmission due to viscous friction of the transmission and other vehicle components.

SUMMARY OF THE INVENTION

Accordingly, the method and apparatus of the present invention allow for the optimization of torque converter slip levels or TC slip in a vehicle having a hydrodynamic torque converter assembly as described above. The apparatus includes an electronic control unit or controller having an algorithm for executing the method of the invention, wherein execution of the method continuously trains the controller by adapting an initial or baseline TC slip profile or curve to more closely approximate the natural slip curve of a particular vehicle over time. The adapted TC slip profile or curve is then used as a control parameter for controlling the TC slip of that vehicle during certain transmission states, for example a neutral idle (NI) transmission state.

In particular, the algorithm continuously "learns" by sampling the TC slip-versus-temperature data points during certain threshold vehicle performance conditions, i.e., during conditions that are determined to be stable, or otherwise the most conducive to accurate data sampling. For example, TC slip-versus-temperature data points can be sampled or gathered whenever the vehicle is operating in a park (P) or neutral (N) and slowly coasting, such as when the vehicle is being moved through a car wash, while the vehicle is idling in a park (P) state in a parking lot or during another extended stop, etc. As TC slip varies inversely with temperature, the "learning" or adaptive phase of the algorithm or method can be further optimized by gathering TC slip-versus-temperature data points during extreme hot or cold temperature conditions, e.g., when the vehicle is started either directly or remotely and left idling for an extended period in the winter or summer in order to respectively warm or cool the cabin prior to entry.

In accordance with the invention, execution of the method controls an amount of torque converter (TC) slip in a transmission having a hydrodynamic torque converter assembly. The method includes setting a baseline TC slip profile, determining an actual TC slip value at different temperatures, generating an adapted TC slip profile by continuously adapting the baseline TC slip profile in response to the actual TC slip values, and controlling the amount of TC slip during a neutral idle (NI) state of the transmission using the adapted TC slip profile as a reference command to a neutral idle (NI) control system.

A vehicle includes an engine having an output shaft, a transmission having an input shaft, and a hydrodynamic torque converter assembly for selectively coupling the output shaft to the input shaft. The torque converter assembly includes a pump connected to the output shaft, a turbine connected to the input shaft, fluid, and a stator configured to redirect the fluid from the pump to the turbine. The vehicle also includes a controller and sensors for determining an amount of TC slip across the torque converter assembly, for example by sensing or measuring the engine speed ($N_E$) on the pump side of the torque converter assembly and the turbine speed ($N_T$) on the turbine side of the torque converter assembly, and then calculating the slip as $N_E$–$N_T$. Using the method of the invention, the controller learns the amount of TC slip during a first transmission state, and controls the amount of TC slip during a second transmission state (i.e., Neutral Idle (NI)) different from the first transmission state. The controller measures a plurality of actual TC slip data points, and continuously adapts a TC slip profile to more closely approximate a natural slip curve of the vehicle in response to the actual slip TC slip value data points.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
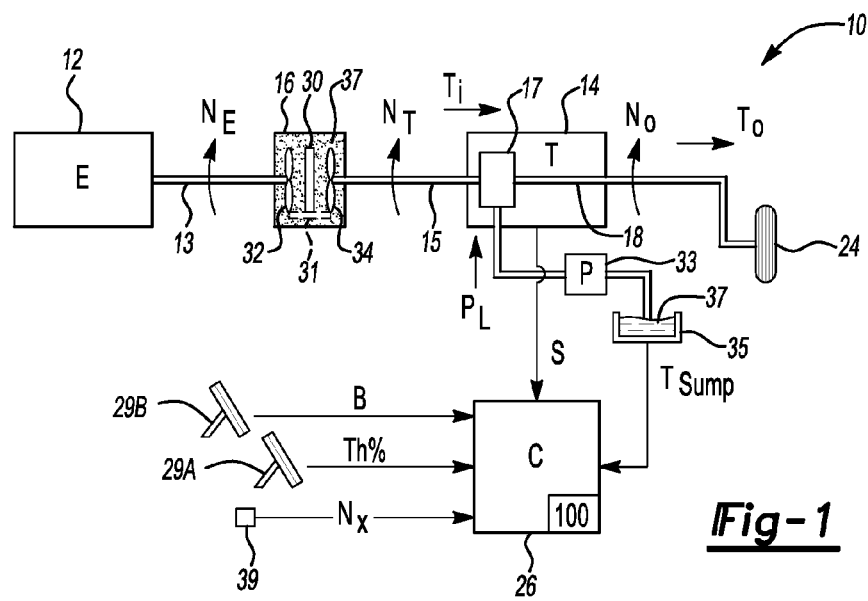
FIG. 1 is a schematic representation of a vehicle having a hydrodynamic torque converter assembly in accordance with the invention.

Referring to the drawings wherein like reference numbers correspond to like or similar components throughout the several figures, and beginning with FIG. 1, a vehicle 10 includes an internal combustion engine (E) 12 which is selectively and/or variably connected to an automatic transmission (T) 14 via a hydrodynamic torque converter assembly or torque converter 16. The engine 12 has an output shaft 13 which rotates at an engine speed $N_E$. The transmission 14 in turn has an input shaft 15 which rotates at a speed $N_T$. Transfer of an input torque ($T_i$) to the transmission 14 occurs through the torque converter 16 as described below. The transmission 14 also has an output shaft 18, which ultimately conveys a transmission output torque ($T_o$) transmitted from one or more clutch assemblies 17 and gear sets (not shown) to thereby propel the vehicle 10 via drive wheels 24. The clutch assemblies 17 can be selectively actuated through electro-hydraulic controls which are powered by pressurized fluid delivered from a pump (P) 33 at line pressure ($P_L$). The pump 33 is configured to draw fluid 37 from a reservoir or sump 35, with the fluid 37 having a measurable or detectable temperature ($T_{Sump}$).

The engine 12 and the torque converter 16 are in communication with an electronic control unit or controller 26, which is configured for storing and accessing an algorithm 100 that is specially adapted to execute the method described below with reference to FIG. 2. The controller 26 can be configured as a microprocessor-based device having such common elements as a microprocessor or CPU, memory including but not limited to: read only memory (ROM), random access memory (RAM), electrically-programmable read-only memory (EPROM), etc., and circuitry including but not limited to: a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry. However configured, the controller 26 is operable for executing the algorithm 100 of FIG. 2 as needed in order to execute the method of the invention as set forth hereinbelow.

The controller 26 is configured for receiving, reading and/or measuring, calculating, and recording or storing various required measurements, values, or figures including any required readings fully describing the engine speed ($N_E$) and the transmission output speed ($N_O$), such as via one or more speed sensors 39 having an output speed or speeds labeled generically as $N_X$. The speed signals $N_E$, $N_O$ are preferably transmitted electrically via conductive wiring, although any transmitting means such as, for example, radio frequency (RF) transmitters and receivers suitable for conveying or transmitting the required information to the controller 26, are also usable within the scope of the invention.

Still referring to FIG. 1, the torque converter 16 can be configured as a conventional hydrodynamic torque converter having a stator 30 disposed or positioned between an impeller or a pump 32, i.e., the drive member, and a turbine 34 or driven member. A lockup clutch or TCC 31 can also be used to selectively lock the pump 32 to the turbine 34 above a threshold lockup speed, as will be understood by those of ordinary skill in the art. The pump 32 can be bolted or otherwise directly connected to the output shaft 13 of the engine 12 to thereby rotate at engine speed ($N_E$) in conjunction with the engine 12. Within the torque converter 16, the turbine 34 is driven by fluid 37, with the turbine 34 in turn connected to the input shaft 15 of the transmission 14. Thus, rotation of the turbine 34 ultimately rotates the input shaft 15 of the transmission 14 at a rate or speed $N_T$ that is less than or equal to the engine speed ($N_E$), with viscous drag or friction losses within the clutches 17 and other connected portions of the transmission 14 tending to reduce the speed $N_T$ to a level less than that of engine speed ($N_E$).

The transmission 14 can be configured as a multi-speed transmission suitable for establishing a plurality of transmission operating modes or states, including reverse (R), neutral (N), and various forward drive states (D), as well as an optional overdrive state. Regardless of the configuration of the transmission 14, within the scope of the invention the controller 26 can utilize the algorithm 100 of FIG. 2 to establish a neutral idle (NI) state. As used herein, the term "neutral idle" refers to a transmission state which reduces idle fuel consumption whenever the transmission 14 is set to drive or D and the vehicle 10 is caused to remain stationary.

In neutral idle (NI), the transmission 14 is placed into drive (D) while one of the electro-hydraulic clutch pressure regulation valves (not shown) reduces pressure on the designated Neutral Idle clutch in the transmission 14, thereby placing the transmission 14 into a partially-loaded "hydraulic neutral" state. Data necessary for the algorithm 100 is sampled and processed during other neutral conditions, i.e., neutral (N) and park (P) as described below. The level of slip across the torque converter 16 is referred to herein for clarity as the TC Slip, with TC Slip=[$N_E-N_T$]. That is, when the TCC 31 is fully locked, $N_E=N_T$, and therefore TC Slip is zero. Absent lockup of the TCC 31, or when the TCC 31 is not used as part of the torque converter 16, there is expected to be at least some level of TC Slip due to viscous drag or friction from the clutches 17 of the transmission 14. Calibration and control of TC Slip during various neutral conditions to minimize idle fuel consumption is therefore enabled via the algorithm 100 of FIG. 2 as described below.

Still referring to FIG. 1, the transmission 14 can be shifted into one of a number of transmission operating modes, gears, or states, including drive (D), park (P), reverse (R), and neutral (N). Neutral idle (NI) can be provided when the transmission 14 is set to drive (D) or reverse (R). That is, when a PRNDL shifter device (not shown) is set to park (P) or neutral (N) while the engine 12 is running, the vehicle 10 is considered to be in a true neutral mode. By way of contrast, neutral idle (NI) is established when the transmission 14 of the vehicle 10 remains in drive (D), but the vehicle 10 is prevented from moving by application of a sufficient amount of braking force (arrow B) on a brake input device or brake pedal 29B. The controller 26, or alternately a separate transmission controller, controls the transition between the various states using a plurality of different vehicle performance conditions.

Exemplary vehicle performance conditions can include: vehicle speed (N), a value which can be directly measured by one or more sensors 39, shown separately for clarity but which could be positioned as needed within the vehicle 10, e.g., at or along the output shaft 18 of the transmission 14 and/or at the road wheels 24, etc; throttle level (Th %) of a throttle input device such as an exemplary accelerator pedal 29A; braking level (B) such as travel and/or force applied to the brake pedal 29B; a predetermined PRNDL setting (S) of the transmission 14; a temperature ($T_{Sump}$) of the fluid 37 in the sump 35 of the transmission 14; etc.

Conventional calibration of TC slip involves generating various data points at various temperatures describing a TC Slip-versus-temperature as a curve for a particular vehicle design, with this reference curve generated by sampling data in a calibration vehicle when the PRNDL setting of the calibration vehicle is park (P). To this calibration curve is usually added a fixed calibrated adjustment factor, for example +50 RPM. The final calibration curve with the added adjustment factor is then programmed into a controller and used to control the TC slip in all vehicles of the same model or design.

The effect of the conventional method described above is that at least some percentage of the vehicles of a given design will not achieve a TC slip that approaches the natural minimum slip for that particular vehicle, or due to an arbitrarily high safety factor does not achieve an optimal TC slip for a given temperature. That is, the unique TC slip level that can differ between individual vehicles of a common model or design based on that vehicle's unique performance and build history, use, wear, etc. Instead, the conventional method enforces an arbitrarily high slip level across all vehicles of a given design based on the behavior of a representative calibration vehicle or vehicles. However, for some transmission designs a lower threshold engine load is desirable whenever the transmission is operating in a neutral idle (NI) state, which may not be otherwise attainable using conventional adjustment factors or margins as noted above.

Figure 2:
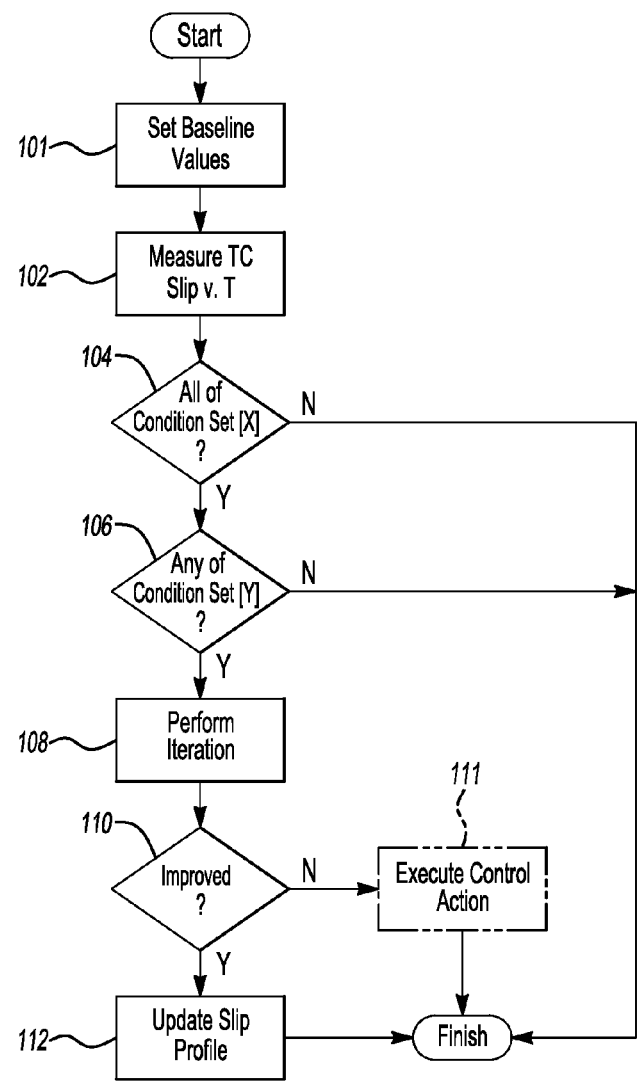
FIG. 2 is a graphical flow chart describing an algorithm for executing the method of the invention for automatically adapting the TC slip level of the vehicle of FIG. 1.

Referring to FIG. 2, the algorithm 100 of the present invention provides a method for reducing idle fuel consumption whenever the PRNDL setting of the vehicle 10 of FIG. 1 is shifted or transitioned to drive (D) or reverse (R) at idle, i.e., a partially loaded "hydraulic neutral" state as described above. The torque converter 16 is allowed to slip, and a closed loop control methodology provided by the controller 26 of FIG. 1 controls the amount or level of TC slip. Closed loop control of TC Slip occurs during the Neutral Idle (NI) mode or state described above, preferably although not necessarily when the vehicle 10 of FIG. 1 is positioned on a relatively level surface. Optimization of the TC Slip is based on continuously adapting a TC slip curve for a given vehicle using actual historical performance measurements and data fitting for that particular vehicle.

Figure 3:
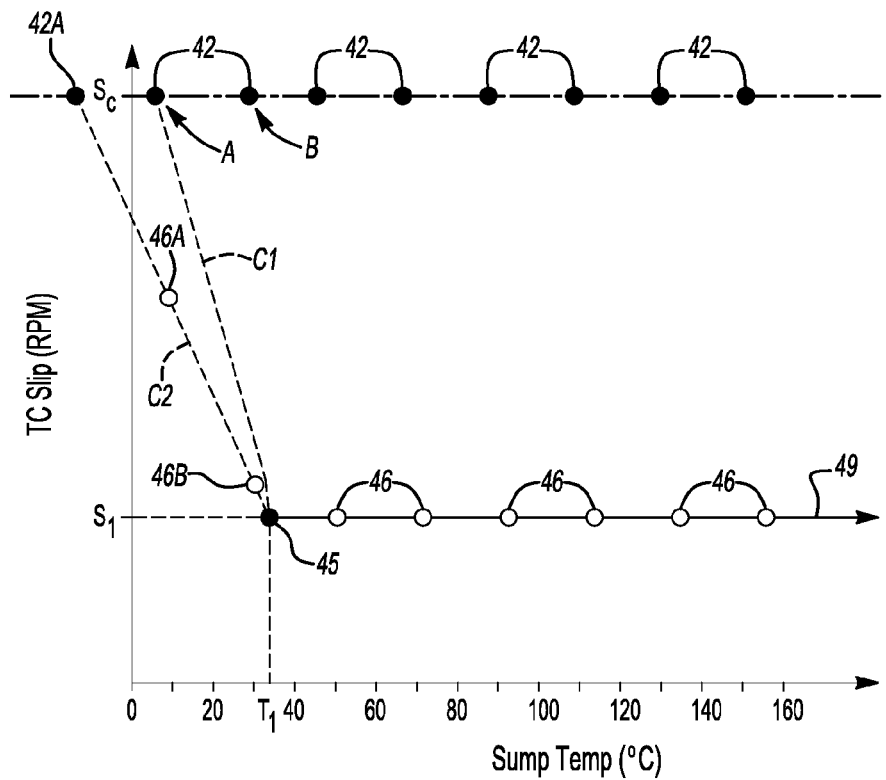
FIG. 3 is a graphical illustration describing a first iteration of a TC slip profile in response to a first TC slip-versus-temperature data point.

Beginning at step 101, the algorithm 100 initiates by recording, storing, or otherwise setting data points or values describing a calibrated baseline TC slip. The baseline TC slip serves as a starting point or baseline calibration, with the remainder of the algorithm 100 adapting the baseline TC slip to generate a continuously improving TC slip profile. Referring briefly to FIG. 3, the calibrated baseline TC slip is represented as a set of baseline data points 42 at various temperatures, with each baseline data point 42 having a common slip magnitude SC in the exemplary embodiment of FIG. 3. In an alternate embodiment, the baseline data points 42 could each have different magnitudes to thereby form a non-linear curve, although for simplicity the common magnitude $S_C$ will be used hereinafter to describe the algorithm 100. The common magnitude $S_C$ must be set sufficiently high to capture the highest possible TC slip occurring at the lowest expected operating temperature. Once the baseline data points 42 are set or recorded in the controller 26, the algorithm 100 proceeds to step 102.

At step 102, TC Slip-versus-temperature, i.e., $T_{Sump}$, is measured at a first predetermined temperature ($T_1$) and then plotted or otherwise recorded in a form accessible by the controller 26. Referring to FIG. 3, the data point measured at step 110 is represented as the actual data point 45 having a corresponding temperature $T_1$ and a TC slip $S_1$. Once the actual data point 45 has been plotted or otherwise recorded, the algorithm 100 proceeds to step 104.

At step 104, the algorithm 100 determines if every element of a predetermined condition set [X] is present. As used herein, the condition set [X] describes at least the following conditions: a temperature ($T_{Sump}$) that has a rate of change falling within a threshold range, thus indicating an acceptable amount of temperature stability; a TC slip that has a rate of change falling within a threshold range, thus indicating an acceptable amount of slip stability; a PRNDL setting (S) corresponding to park (P) or a slow rate of coasting within Neutral (N), i.e., a rate falling below a predetermined threshold rate; and an absence of other actively running vehicle diagnostics. Additionally, condition set [X] can include a determination that temperature ($T_{Sump}$) has changed sufficiently since the last iteration (step 108) to warrant a run through the algorithm 100. However condition set [X] is ultimately defined, the algorithm 100 proceeds to step 106 only if each and every one of the elements of condition set [X] is present. Otherwise, the algorithm 100 is finished, resuming with step 102 upon initiation of its next control loop or cycle.

At step 106, the algorithm 100 determines if any one element of a condition set [Y] is present. As used herein, the condition set [Y] describes at least the following conditions: a determination of whether the TCC slip profile has converged upon a definitive result; a determination of whether of the algorithm 100 is in an active data collection state (awake) (see step 111); or an unexpectedly high/low temperature ($T_{Sump}$). However condition set [Y] is ultimately defined, the algorithm 100 proceeds to step 106 only if at least one of the elements of condition set [Y] is present. Otherwise, the algorithm 100 is finished, resuming with step 102 upon initiation of its next control loop or cycle.

At step 108, a first iteration is performed, e.g., by executing a data point interpolation and sorting function. In its initially executed control loop, the first iteration is performed on the baseline data points 42 of FIG. 3 based on the actual data point 45 recorded or plotted at step 110. This occurs only once for a given vehicle, as the algorithm 100 is continuously iterating and therefore adapting the TC slip profile for that particular vehicle thereafter. As used herein, the term "iteration" refers to any curve fitting or interpolation methodology or other adjustment to the baseline data points 42 and subsequent TC slip profile in response to the measured position of the actual data point 45.

Specifically, each of the baseline data points 42 is adapted or modified in response to the actual data point 45 in one of two manners. The first manner includes lowering the magnitude of a first subset or number of the data points 42 to the level or magnitude of the actual data point 45 for each data point 42 having a temperature at least as great as that of the actual data point 45, i.e., a temperature greater than or equal to the temperature $T_1$. The second manner is by plotting a line between the actual data point 45 and each of the data points 42 having a temperature less than the temperature $T_1$, including a minimum baseline data point 42A having the lowest temperature of all the data points 42.

Referring to FIG. 3, the data points 42 to the right of the data point 42 indicated by the arrow B each have a temperature greater than $T_1$. Therefore, these data points 42 are lowered to the magnitude or level $S_1$ of the actual data point 45. The other data points 42A and 42 to the left of $T_1$ are iterated in a different manner as explained above. That is, a line C1 is drawn between the actual data point 45 and the data point 42 indicated by the arrow A. Likewise, a line C2 is drawn between the actual data point 45 and the data point 42A.

Once the lines C1 and C2 are properly plotted, each of the data points 42A, 42 having a corresponding temperature less than the temperature $T_1$ are adapted downward until they are intersected by one of the lines C1 and C2. In FIG. 3, the data point 42 indicated by the arrow A is adapted downward until it is intersected by line C2, with the locus of intersection forming the adapted or new data point 46A. Likewise, the data point 42 that is indicated by the arrow B is lowered or moved downward until it is intersected by one of the lines C1 and C2.

Since this data point can be intersected by either of the lines C1 and C2, the algorithm 100 selects the point having the lowest TC slip, i.e., the locus of intersection with line C2. The adapted or new data point 46B is formed at this location as shown in FIG. 3. Therefore, with a single iteration an adapted TC slip profile or curve is generated, i.e., the line 49 as defined by each of the data points 46 positioned to the right of the actual data point 45 in FIG. 3, taken together with the line C2. The baseline conditions set at step 102 are then overwritten, with the adapted TC slip profile (line 49) now used to control slip across the torque converter 16 of FIG. 1

Step 108 as explained thus far describes a first iteration. An exemplary second iteration is described with reference to FIG. 4. Here, a different TC Slip-versus-temperature, i.e., $T_{Sump}$, is measured at step 102 and plotted or otherwise determined and recorded in a form accessible by the controller 26. The data point generated is shown as the actual data point 55 having a corresponding temperature $T_2$ and a corresponding TC slip $S_2$. Then, at step 108 the previously-adapted values described above are shown as the curve 49, i.e., the adapted TC slip profile. The curve 49 in this exemplary second iteration is now further adapted to more closely approach the natural TC slip curve of the vehicle 10 of FIG. 1.

Each of the data points 46 having a temperature greater than or equal to $T_2$ are lowered to the level of $S_2$. A line C3, C4, and C5 is plotted between the newly-recorded actual data point 55 and each of the respective data points 46C, 46B, and 45 having a temperature less than the temperature $T_2$. When the data point 46C is adapted downward it can be intersected by either of the lines C4 and C5. To form the adapted baseline curve 149, the lowest or most improved point is selected, i.e., the point intersected by the line C5. This new point is shown as the data point 48C in FIG. 4. As none of the other data points 42A, 46A, 46B, and 45 are intersected by a line C3-C5 as they are adapted downward, the newly adapted baseline curve 149 is defined by the points: 42A, 46A, 46B, 45, 48C, 55, and each of the points 48. When the algorithm 100 has completed its iteration, the algorithm 100 proceeds to step 110.

Figure 4:
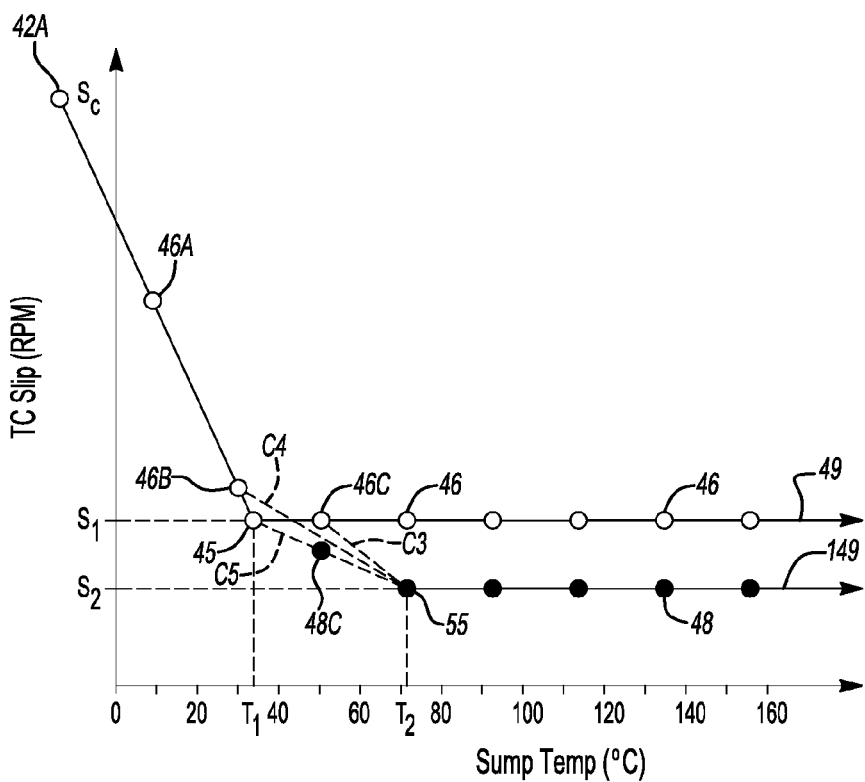
FIG. 4 is a graphical illustration describing a second iteration of a TC slip profile in response to a second TC slip-versus-temperature data point.

At step 110, the algorithm 100 determines if the adapted TC slip profile or curve, for example the curve 149 of FIG. 4, is an improvement over the previous adapted TC slip profile or curve, e.g., the curve 49 of FIG. 3. For example, an improvement can be determined to be present if at least one data point is adapted or modified in the forgoing iterations step 108. If no improvement is seen, the algorithm 100 is finished. The TC slip profile temporarily stored or recorded at step 108 can be purged or deleted. If improvement is indicated, the algorithm 100 proceeds to step 112.

At step 111, shown in phantom in FIG. 2, the algorithm 100 can optionally execute one or more control actions in the event no improvement is seen at step 110. Step 11 can include moving the entire adapted TC slip profile or curve 149 of FIG. 4 upward a calibrated amount, for example increasing each data point forming the adapted TC profile or curve 149 by approximately 5 to 15 RPM or another desired amount. The algorithm 100 can then resumes at step 102 in its next execution, with iteration step 108 further adapting this arbitrarily elevated TC slip profile in the manner described above. Also at step 11, the algorithm 100 can also or alternately determine if the adapted TC slip profile or curve, e.g., the curve 149 of FIG. 4 is less than a calibrated minimum TC slip. If so, the algorithm 100 can execute the control action described above by increasing the TC slip profile, effectively bumping up the entire TC slip profile by an arbitrary or calibrated amount. After executing step 11, the algorithm 100 is finished.

At step 112, having determined at step 110 that the adapted TC slip profile is an improvement over the previously adapted TC slip profile, the algorithm 100 stores or records the most recent result from step 108 as the new TC slip profile. The algorithm 100 is then finished.

After step 112, the TC slip level of the vehicle 10 of FIG. 1 can be controlled by applying the adapted TC slip profile as determined by the algorithm 100. As noted above, initially the "adapted" TC slip profile for the vehicle 10 will be the calibrated baseline TC slip described at step 101 above, with the baseline TC slip defined by the data points 42 in FIG. 3. After the algorithm 100 has run through at least one control loop, the adapted TCC slip profile will change, gradually and more accurately converging on an unknown "natural" slip profile of the vehicle 10 with each successive iteration at step 108 as described above.

While the best modes for carrying out the invention have been described in detail, those familiar with the art to which this invention relates will recognize various alternative designs and embodiments for practicing the invention within the scope of the appended claims.

The invention claimed is:

1. A method of learning an amount of naturally occurring slip at a plurality of temperatures and controlling an amount of torque converter (TC) slip across a hydrodynamic torque converter assembly in a transmission in response to the naturally occurring slip, the method comprising:
    setting a baseline TC slip profile for each of a plurality of different temperatures;
    determining an actual TC slip value at a predetermined temperature;
    generating an adapted TC slip profile by adapting the baseline TC slip profile in response to the actual TC slip value; and
    controlling, via a controller, the amount of TC slip across the hydrodynamic torque converter assembly during a neutral idle (NI) state of the transmission using the adapted TC slip profile as the naturally occurring slip to thereby minimize idle fuel consumption.

2. The method of claim 1, wherein setting a baseline TC slip profile includes setting a constant slip magnitude for each of the plurality of different temperatures.

3. The method of claim 1, wherein determining an actual TC slip value at a predetermined temperature includes measuring a first TC slip value at a first predetermined temperature, and measuring a second TC slip level at a second predetermined temperature that is approximately 20 to approximately 40 degrees Celsius (° C.) higher than the first predetermined temperature.

4. The method of claim 1, wherein the method is executed only when a rate of change of each of a set of predetermined vehicle performance conditions is substantially zero during one of a Neutral (N) state and a Park (P) state of the transmission.

5. The method of claim 1, wherein determining an actual TC slip value at a predetermined temperature includes determining a corresponding actual TC slip value at each of a plurality of different temperatures, including at least one temperature of less than approximately 0° C. and at least a temperature of greater than approximately 80° C.

6. The method of claim 1, wherein the hydrodynamic torque converter includes a rotatable pump and a rotatable turbine, and wherein determining a corresponding actual TC slip level includes directly measuring a speed differential between the rotatable pump and the rotatable turbine.

7. A method of learning an amount of naturally occurring slip at a plurality of temperatures and controlling an amount of torque converter (TC) slip across a hydrodynamic torque converter assembly in a transmission in response to the naturally occurring slip, the method comprising:

recording a TC slip value baseline data point at each of a plurality of different temperatures, wherein the baseline data points each share a common magnitude;

measuring an actual TC slip value data point at a predetermined temperature;

adapting the set of baseline data points using the actual TC slip value data point to thereby form a set of adapted TC slip value data points by:

adapting a first number of the baseline data points downward to the level of the actual TC slip level data point, wherein the first number includes all of the baseline data points having a temperature greater than or equal to the predetermined temperature of the actual TC slip value data point;

plotting a line between the actual TC slip value data point and each of a second number of the baseline data points, wherein the second number includes all of the baseline data points having a temperature less than the predetermined temperature; and adapting each of the second number of the baseline data points to a level of a predetermined one of the lines plotted between the actual TC slip value data point and each of the second number of the baseline data points; and controlling, via a controller, the amount of TC slip during a neutral idle (NI) state of the transmission using the set of adapted TC slip value data points as the naturally occurring slip to thereby minimize idle fuel consumption.

8. The method of claim 7, wherein the method is executed only when a rate of change of a predetermined vehicle condition is less than a calibrated threshold rate during one of a Neutral (N) state and a Park (P) state of the transmission.

9. The method of claim 8, wherein the predetermined vehicle condition includes at least one of: a throttle level, a vehicle speed, a TC slip rate of the torque converter assembly, and a temperature of a fluid within the transmission.

10. The method of claim 7, further comprising:

comparing the set of adapted TC slip value data points to a calibrated minimum slip level; and increasing the magnitude of each data point in the set of adapted TC slip value data points by a predetermined amount when the set of adapted TC slip value data points is less than the calibrated minimum slip level.

11. A vehicle comprising:

an engine having an output shaft;
a transmission having an input shaft;
a hydrodynamic torque converter assembly operable for selectively coupling the output shaft to the input shaft, the hydrodynamic torque converter assembly including: a pump connected to the output shaft, a turbine connected to the input shaft, fluid, and a stator configured to redirect the fluid from the pump to the turbine;
a sensor for measuring an amount of torque converter (TC) slip across the hydrodynamic torque converter assembly; and
a controller operable for calibrating the amount of TC slip during a first transmission state, and for controlling the amount of TC slip during the first transmission state and a second transmission state that is different from the first transmission state;
wherein the controller is configured to measure a plurality of actual TC slip data points, and to minimize idle fuel consumption by continuously adapting a TC slip profile to more closely approximate a natural slip curve of the vehicle in response to the plurality of actual slip TC slip value data points.

12. The vehicle of claim 11, wherein the controller is configured to calibrate the TC slip level during the first transmission state by measuring the TC slip level at a predetermined temperature, adapting a baseline set of TC slip level-versus-temperature data points in response to the TC slip level, and recording the adapted data points as an adapted TC slip profile; and wherein the controller controls the TC slip level using the adapted TC slip profile during the second transmission state.

13. The vehicle of claim 11, wherein the first transmission state is one of a neutral (N) or a park (P) transmission state, and wherein the second transmission state is a neutral idle (NI) transmission state.

14. The vehicle of claim 11, wherein the controller is configured to calibrate the TC slip level during the first transmission state only when a rate of change of a set of vehicle conditions is less than a predetermined threshold.

15. The vehicle of claim 14, wherein the set of vehicle conditions includes a threshold minimum rate of change of at least one of: a throttle level, a vehicle speed, a TC slip rate of the torque converter assembly, and a temperature of a fluid sump portion of the transmission.

16. The vehicle of claim 14, wherein the controller is configured to compare the adapted TC slip profile to a calibrated minimum slip, and to increase the magnitude of the adapted TC slip profile when each of the data points forming the adapted TC slip profile are less than the calibrated minimum slip.

* * * * *